MECHANICAL FILTERS INCLUDING REJECTORS

Original Filed April 28, 1953

INVENTOR.
Leslie L. Burns, Jr.

BY Charles H. Brown
ATTORNEY 2,821,686

MECHANICAL FILTERS INCLUDING REJECTORS

Leslie L. Burns, Jr., Princeton, N. J., assignor to Radio Corporation of America, a corporation of Delaware Continuation of application Serial No. 351,696, April 28, 1953. This application July 15, 1955, Serial No. 522,267

17 Claims. (Cl. 333—71)

This invention relates to mechanical filters and more particularly to band pass filters having frequency rejector means to attenuate frequencies on one or both sides of the pass band.

This application is a continuation of copending application Serial No. 351,696, filed on April 28, 1953, now abandoned.

An ideal band pass filter would pass all frequencies within a predetermined band and completely attenuate all frequencies outside the pass band. Practical filters only partially attenuate the frequencies immediately adjacent the pass band. Therefore a chart of the frequency response of a practical filter shows sloping sides on either side of the pass band. In the electronic arts it is often desirable to employ filters which provide a band pass characteristic with steep sides and large attenuation notches on both sides of the pass band. In the translation of an amplitude modulated carrier wave it is often desirable to employ a filter which passes one of the side bands and greatly attenuates the carrier frequency immediately beside the pass band.

It is therefore a general object of this invention to provide an improved mechanical filter characterized in having a pass band with a high degree of attenuation to frequencies immediately to one side or both sides of the pass band.

It is another object to provide an improved mechanical band pass filter construction providing any desired attenuation characteristic adjacent the pass band.

In one aspect, the invention comprises a band pass mechanical filter operative in either the longitudinal or torsional modes of oscillation. The filter comprises a plurality of half-wave resonators mechanically coupled together in a line by coupling necks. One or both sides of the pass band frequency characteristic of the filter are steepened by the action of one or more rejector resonators mechanically coupled to one of the in-line resonators.

The present invention is for the same general purpose as the invention described and claimed in Patent No. 2,605,354 on a "Mechanical Filter" issued on July 29, 1952, to L. L. Burns, Jr., and Walter van B. Roberts, and assigned to the assignee of this application. In Patent No. 2,605,354, the rejector resonators are incorporated with the inductors in the electrical drive and take-off circuits. According to the present invention, the rejector resonators are mechanically coupled to a resonator of the mechanical filter.

Other objects and aspects of the invention will be apparent to those skilled in the art from a reading of the following detailed description of the invention containing references to the accompanying drawings wherein:

Fig. 2 is a characteristic chart of the filter of Fig. 1;

Fig. 3 illustrates another form of the invention wherein two half-wave rejector resonators are employed to steepen both sides of the characteristics curve or to widen the rejection notch on one side of the curve;

Fig. 4 illustrates another arrangement comparable to that of Fig. 3;

Fig. 5 illustrates another manner in which the rejector resonator may be coupled to a filter resonator; and Fig. 6 illustrates a form of the invention wherein one or more quarter-wave rejector resonators are connected to the filter resonator.

Figure 1:
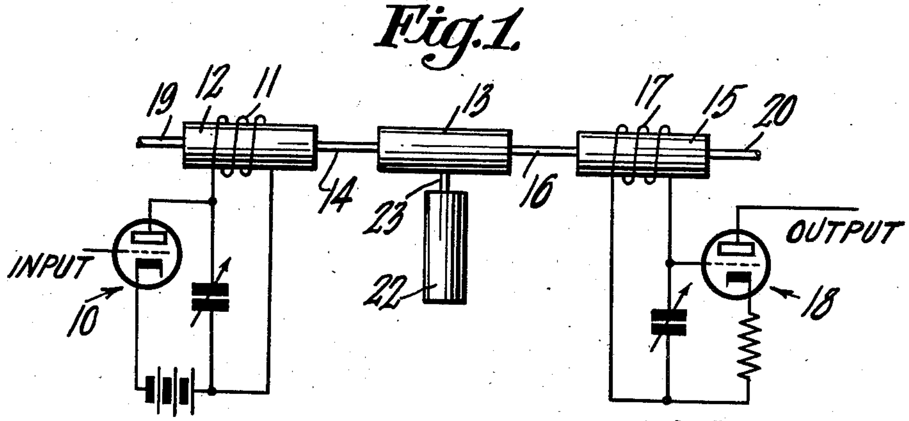
Fig. 1 is a representation partly mechanical and partly schematic of a band-pass filter constructed according to the teachings of this invention.
Figure 1:
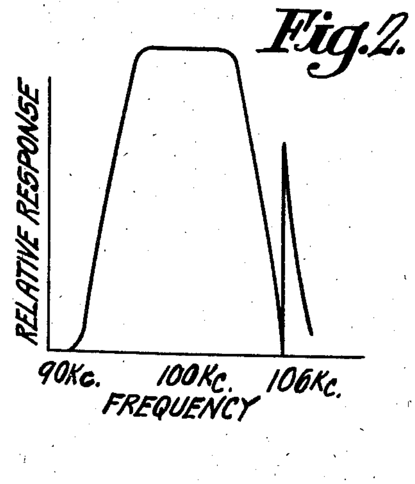
Figure 1:
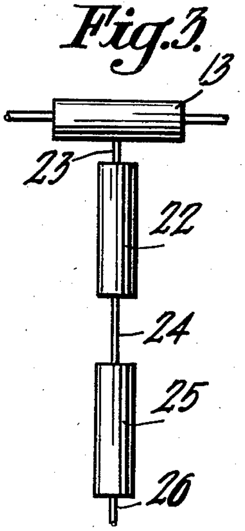
Figure 1:
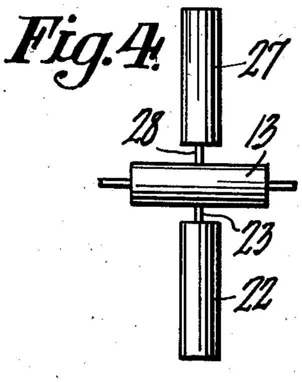
Figure 1:
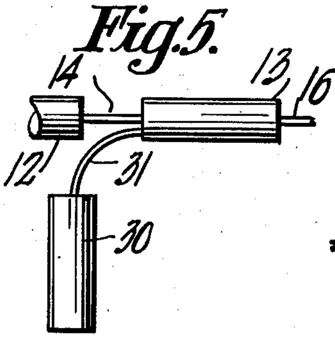
Figure 1:
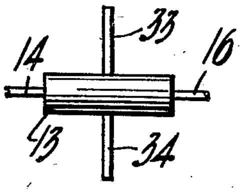

Fig. 1 shows a magnetostrictive band-pass filter having an electrical drive at one end and an electrical take off at the other end. Electrical oscillations in the vacuum tube circuit 10 flow through drive coil 11 and produce magnetic oscillations in magnetostrictive driver 12. Magnetostrictive driver 12 is a half wave mechanical resonator of magnetostrictive material (or coated with a magnetostrictive material) which is magnetically biased by residual magnetism or by a nearby-disposed permanent magnet (not shown). The magnetic oscillations in driver 12 result in mechanical oscillations therein. Mechanical oscillations in driver 12 are mechanically coupled to mechanical resonator 13 by means of a quarter-wave coupling neck 14. Longitudinal mode vibrations are in turn coupled to output magnetostrictive resonator 15 through quarter-wave coupling neck 16. Output resonator 15, like the input driver 12, is of magnetostrictive material and is magnetically biased. Mechanical oscillations in output resonator 15 induce electrical oscillations in output coil 17 which are amplified in the output vacuum tube circuit 18 in the usual manner. If the filter is designed to provide a relatively broad frequency pass band, input and output resonators 12 and 15 may be coupled through necks 19 and 20 to long, lossy lines after the teachings of L. L. Burns, Jr., and Walter van B. Roberts in Patent No. 2,750,567 which is assigned to the common assignee.

For operation in the longitudinal mode, the driver resonator 12 is biased with magnetic flux extending axially through the resonator. The longitudinal mode is one wherein a half-wave resonator increases and decreases in axial length. The bias flux may be provided by a permanent magnet (not shown) positioned near the resonator 12 so that flux from the magnet passes substantially axially through the resonator. Alternatively, the resonator 12 may itself be permanently magnetized by any suitable method so that residual magnetic flux passes axially therethrough. The output resonator 15 is also similarly biased with magnetic flux. Only the input or driver resonator 12 and the output resonator 15 require magnetic bias. When the bias is axial, all the resonators of the system oscillate in the longitudinal mode.

For operation in the torsional mode, the driver resonator 12 is itself permanently biased with magnetic flux extending in closed loops circumferentially around the axis of the resonator. The torsional mode is one wherein the half-wave resonator twists back and forth about its axis with the ends rotating in opposite directions at any given instant of time. The circumferential magnetic bias may be conveniently established by momentarily passing current from a six volt storage battery axially through the resonator. The output resonator 15 is also similarly provided with magnetic circumferential self-bias, and all the resonators of the system oscillate in the torsional mode.

According to this present invention, a rejector resonator 22 is coupled by means of a coupling neck 23 to the center of resonator 13. Resonator 13 is a half-wavelength long at the mean frequency of operation of the filter and oscillates in the same mode as the driver resonator 12. If the longitudinal mode is employed, the motion is such that the ends of the resonator move toward and away from each other. The motion is the maximum at the ends and is zero in the center of a half-wave resonator. While the motion in the longitudinal mode at the center of resonator 13 is zero, there is a transverse motion due to Poisson's effect. The manner in which Poisson's effect may be utilized to couple mechanical resonators is set forth by Walter van B. Roberts in Patent No. 2,738,467 which is assigned to the assignee of this application. In the present invention, the transverse oscillations due to Poisson's effects are coupled to a rejector resonator 22 to cause longitudinal mode oscillations in resonator 22.

Rejector resonator 22 also oscillates in the same mode as the other resonators, is a half-wave in length and is tuned to a frequency just outside the pass band of filter 11, 13, 15 at which it is desired to insert a rejection notch in the filter characteristic curve. The rejector 22 acts to absorb energy of the frequency to which it is tuned and to thereby prevent energy at that frequency from reaching output coil 17. The frequency characteristic provided by the filter of Fig. 1 may be as shown in the chart of Fig. 2 wherein frequencies of and near 106 kilocycles are attenuated by rejector resonator 22.

By way of example only, a mechanical filter oscillating in the longitudinal mode was constructed according to the form shown in Fig. 1 to provide the frequency characteristic shown in Fig. 2. Resonators 12, 13 and 15 were 0.945 inch long and 0.250 inch in diameter. Coupling necks 14 and 16 were 0.505 inch long and 0.055 inch in diameter. Rejector resonator 22 was 0.942 inch long and 0.250 inch in diameter. Rejector coupling neck 23 was 0.1 inch long and 0.125 inch in diameter. The material used was a nickel-iron alloy known in the trade as Ni-span C. Rejector coupling neck 23 was made short to increase the coupling between resonator 13 and rejector 22, and to thereby make a deep rejection notch in the characteristic curve. A less deep rejection notch could be provided by making coupling neck 23 a quarter-wave in length (at the mean frequency of the filter) the same as coupling necks 14 and 16.

The foregoing filter was modified for oscillation in the torsional mode by momentarily passing direct current through the driver resonator 12 and through the output resonator 15 to establish circumferential magnetic biases therein. The coupling necks 14 and 16 were also increased in diameter from 0.055 inch to 0.125 inch to provide a degree of coupling in the torsional mode corresponding with that previously had in the longitudinal mode. The resulting filter provided a pass band 6 kilocycles wide and having a center frequency of 60 kilocycles. The same resonators oscillate at 100 kilocycles in the longitudinal mode and at 60 kilocycles in the torsional mode because the velocity of propagation of oscillations through the material in the torsional mode is 60% of the velocity of propagation in the longitudinal mode. The length of the rejector resonator 22 was slightly changed to position the rejection notch at the edge of the pass band. A filter according to Fig. 1 for operation in the torsional mode at 100 kilocycles would require resonators having an axial length about 60% of that given in connection with the example operated in the longitudinal mode.

When half-wave resonators oscillate in the torsional mode, the ends twist back and forth in opposite directions. There is no motion at the axis of the resonator and in a transverse plane through the center of the resonator. Axial coupling necks 14 and 16 couple energy from one resonator to the next because the necks are sufficiently thick to engage the portions around the axis of the resonators where there is oscillatory motion. Similary, the rejector coupling neck 23 is sufficiently thick to engage the portions of resonator 13 on both sides of the transverse plane of no motion. The coupling neck 23 receives a twisting motion from the two oppositely twisting portions on both sides of the transverse nodal plane in resonator 13 in a manner analogous to a pinion between two oppositely rotating gear wheels. The rejector resonator 22 is thus coupled to the resonator 13 and both oscillate in the torsional mode.

Fig. 3 shows a construction for providing a wider rejection notch. An additional rejector resonator 25 is coupled through neck 24 to rejector resonator 22. A neck 26 may couple rejector resonator 25 to a lossy line termination (not shown). Rejector resonators 22 and 25 are both tuned to the frequency at the center of the desired rejection notch. In the absence of a lossy line termination, two side-by-side displaced rejection notches result. The addition of the lossy line termination causes the two previous rejection notches to be merged into one wider rejection notch. The design of the rejector assembly 22, 24, 25 follows the design principles of a band-pass mechanical filter.

The construction shown in Fig. 3 may be designed to provide two rejection notches, one on each side of the pass band frequency characteristic of the filter. In this case, no terminating line is used, resonator 22 is tuned to a frequency at one side of the pass band and resonator 25 is tuned to a frequency at the other side of the pass band. The frequency characteristic of the filter is then as shown in Fig. 2 except that a second similar rejection notch is provided on the left-hand side of the pass band.

Fig. 4 shows an alternative construction for providing two rejection notches, one on each side of the pass band, or one wide rejection notch on one side of the pass band. The first rejector resonator 22 is as described in connection with Figs. 1 and 3, and a second similar rejector resonator 27 is coupled by means of a short coupling neck 28 to the opposite side of filter resonator 13. Rejector resonator 22 is tuned to a frequency on one side of the pass band and rejector resonator 27 is tuned to a frequency on the other side of the pass band; or if a wide rejection notch is desired on one side of the pass band, both rejector resonators are tuned to the same frequency.

Fig. 5 shows another form of the invention wherein a rejector resonator 30 is coupled by means of a curved coupling neck 31 to an end of filter resonator 13. Longitudinal or torsional vibrations in filter resonator 13 are transmitted through neck 31 to set up longitudinal or torsional vibrations, respectively, in rejector resonator 30. Neck 31 will transmit vibrations very satisfactorily so long as the radius of curvature is not too low for the wavelength of the vibratory energy transmitted through the neck. The amplitude of longitudinal vibrations at the end of resonator 13 are larger than those which can be obtained through Poisson's effect from the center of resonator 13. In the torsional case, torsional vibrations are coupled because the motion at the end of resonator 13 increases with radial distance from the axis. The resultant of the motions in the area contacted by coupling neck 31 is such as to transmit torsional vibrations.

Fig. 6 shows a form of the invention wherein rejector resonators 33 and 34, having thicknesses comparable to the thicknesses of coupling necks 14, 16, and lengths of a quarter wave at their rejection frequencies, are directly connected to filter resonator 13 at the center of a half-wave portion thereof. One or any other number of rejector resonators may extend radially from filter resonator 13. Each rejector resonator is tuned to provide a rejection notch in the characteristic curve of the filter at a desired frequency immediately to one or the other side of the pass band. Rejector resonators 33 and 34 provide shallower rejection notches than those provided by the constructions shown in Figs. 1, 3, 4 and 5.

What is claimed is:

1. A mechanical filter comprising a plurality of resonators dimensionally tuned to oscillate in the longitudinal mode at the same frequency and coupled together in a chain to provide a band pass characteristic about said frequency, and a separate rejector resonator dimensionally tuned to oscillate in the longitudinal mode at a frequency just outside said pass band and mechanically coupled at one end to one of said resonators in the chain.

2. A mechanical filter as defined in claim 1 wherein said rejector resonator has a length equal to a quarter wave at the rejection frequency thereof.

3. A mechanical filter comprising a plurality of filter resonators dimensionally tuned to oscillate in the longitudinal mode at the same frequency, coupling necks mechanically coupling said resonators together in a chain to provide a band pass characteristic about said frequency, at least one rejector resonator dimensionally tuned to oscillate in the longitudinal mode at a frequency just outside said pass band, and a rejector coupling neck connecting one end of said rejector resonator to one of said filter resonators.

4. A mechanical filter as defined in claim 3 wherein said rejector coupling neck is connected to the center of a half-wave portion of one of said filter resonators.

5. A mechanical filter as defined in claim 3 wherein said rejector coupling neck is curved and is connected to an end of one of said filter resonators.

6. A mechanical filter as defined in claim 3 and in addition a second rejector resonator and a second rejector coupling neck connecting said second rejector resonator to the center of a half-wave portion of one of said filter resonators.

7. A mechanical filter as defined in claim 3 and in addition a second rejector resonator, and a second rejector coupling neck connecting said second rejector resonator to said first rejector resonator.

8. A mechanical filter as defined in claim 7 wherein said rejector resonators are tuned to frequencies immediately outside the pass band of said filter.

9. A mechanical filter as defined in claim 7 wherein one of said rejector resonators is tuned to a frequency on one side of said pass band and the other rejector resonator is tuned to a frequency on the other side of said pass band.

10. A mechanical filter for providing a band-pass frequency characteristic comprising a plurality of longitudinal mode filter resonators having a length equal to a half wavelength therein at the center-band frequency, coupling means mechanically connecting said filter resonators together in a chain, a longitudinal mode rejector resonator having a length equal to a half-wavelength therein at a frequency which would be at least partially passed by said filter, and a rejector coupling means connecting one end of said rejector resonator to one of said filter resonators.

11. A mechanical filter comprising a plurality of resonators dimensionally tuned to the same frequency and coupled together in a chain to provide a band-pass characteristic about said frequency, and a separate rejector resonator dimensionally tuned to a frequency just outside said pass band and mechanically coupled at one end to one of said resonators in the chain, said resonators in the chain and said rejector resonator all oscillating in the same mode.

12. A mechanical filter comprising a plurality of resonators dimensionally tuned to oscillate in a given mode at the same frequency and coupled together in a chain to provide a band-pass characteristic about said frequency, and a separate rejector resonator dimensionally tuned to oscillate in said given mode at a frequency just outside said pass band, said rejector resonator being mechanically coupled at one end to one of said resonators in the chain.

13. A mechanical filter comprising a plurality of filter resonators dimensionally tuned to oscillate in a given mode at the same frequency, coupling necks mechanically coupling said resonators together in a chain to provide a band-pass characteristic about said frequency, at least one rejector resonator dimensionally tuned to oscillate in said given mode at a frequency just outside said pass band, and a rejector coupling neck connecting one end of said rejector resonator to one of said filter resonators.

14. A mechanical filter for providing a band-pass frequency characteristic comprising a plurality of filter resonators having a length equal to a half-wavelength therein at the center-band frequency, coupling means mechanically connecting said filter resonators together in a chain, a rejector resonator having a length equal to a half-wavelength therein at a frequency which would be at least partially passed by said filter, and a rejector coupling means connecting one end of said rejector resonator to one of said filter resonators, said filter resonators and said rejector resonators being tuned for operation in the same mode.

15. A mechanical filter comprising a plurality of resonators dimensionally tuned to oscillate in the torsional mode at the same frequency and coupled together in a chain to provide a band-pass characteristic about said frequency, and a separate rejector resonator dimensionally tuned to oscillate in the torsional mode at a frequency just outside said pass band and mechanically coupled at one end to one of said resonators in the chain.

16. A mechanical filter comprising a plurality of filter resonators dimensionally tuned to oscillate in the torsional mode at the same frequency, coupling necks mechanically coupling said resonators together in a chain to provide a band-pass characteristic about said frequency, at least one rejector resonator dimensionally tuned to oscillate in the torsional mode at a frequency just outside said pass band, and a rejector coupling neck connecting one end of said rejector resonator to one of said filter resonators.

17. A mechanical filter comprising a plurality of resonators dimensionally tuned to oscillate in a given mode at the same frequency and coupled together in a chain to provide a band-pass characteristic about said frequency, and a separate rejector resonator dimensionally tuned to oscillate in said given mode at a frequency just outside said pass band and mechanically coupled to to one of said resonators in the chain to be mechanically driven tnereby.

References Cited in the file of this patent

UNITED STATES PATENTS

| | | |
|---|---|---|
| 1,781,469 | Mason | Nov. 11, 1930 |
| 2,342,869 | Kinsley | Feb. 29, 1944 |
| 2,617,882 | Roberts | Nov. 11, 1952 |